United States Patent
Drocco (10) Patent No.: US 12,150,452 B2
(45) Date of Patent: Nov. 26, 2024

(54) KNEADING TOOL

(71) Applicant: Sancassiano S.p.A., Roddi d'Alba (IT)

(72) Inventor: Davide Drocco, Roddi d'Alba (IT)

(73) Assignee: Sancassiano S.p.A., Roddi d'Alba Cuneo (IT)

( * ) Notice: Subject to any disclaimer, the term of this patent is extended or adjusted under 35 U.S.C. 154(b) by 215 days.

(21) Appl. No.: 17/342,793

(22) Filed: Jun. 9, 2021

(65) Prior Publication Data

US 2021/0386075 A1    Dec. 16, 2021

(30) Foreign Application Priority Data

Jun. 10, 2020   (IT) .................. 102020000013876

(51) Int. Cl.
| | |
|---|---|
| A21C 1/14 | (2006.01) |
| A21C 1/02 | (2006.01) |
| B01F 27/091 | (2022.01) |
| B01F 27/1125 | (2022.01) |
| B01F 27/906 | (2022.01) |
| B01F 101/08 | (2022.01) |

(52) U.S. Cl.
CPC .............. A21C 1/1405 (2013.01); A21C 1/02 (2013.01); B01F 27/091 (2022.01); B01F 27/11253 (2022.01); B01F 27/906 (2022.01); *B01F 2101/08* (2022.01)

(58) Field of Classification Search
CPC .................................................. A21C 1/1405
USPC ..................................... 366/98, 325.4, 330.3
See application file for complete search history.

(56) References Cited

U.S. PATENT DOCUMENTS

| | | | | |
|---|---|---|---|---|
| 30,764 | A * | 11/1860 | Scott ........................ | A21C 1/02 366/98 |
| 133,625 | A * | 12/1872 | Broman .................. | A01J 25/00 366/325.4 |
| 1,066,665 | A * | 7/1913 | Seward .......................... | 366/331 |
| 1,995,465 | A * | 3/1935 | Bigelow ................. | B01F 27/80 366/330.3 |
| 2,000,370 | A * | 5/1935 | Babcock ................ | A23C 3/031 366/330.3 |
| 2019/0110494 | A1* | 4/2019 | Brockmann ............ | B01F 27/85 |

FOREIGN PATENT DOCUMENTS

EP          3473107 A1    4/2019

OTHER PUBLICATIONS

Search Report dated Feb. 18, 2021. 7 pages.

* cited by examiner

*Primary Examiner* — David L Sorkin
(74) *Attorney, Agent, or Firm* — RMCK Law Group PLC (57) ABSTRACT

A kneading tool of a type prearranged for being mounted rotatable about an axis of rotation of a kneading machine includes: a central shaft defining a main axis; and plurality of arms transverse to said shaft, which are positioned in different orientations about the main axis and/or in different positions along said axis so as to be staggered and not overlying with respect to one another.

13 Claims, 7 Drawing Sheets

KNEADING TOOL

CROSS-REFERENCE TO RELATED APPLICATION

This application claims priority to Italian Patent Application No. 102020000013876 filed Jun. 10, 2020. The disclosure of the above application is incorporated herein by reference in its entirety.

FIELD OF THE INVENTION

The present invention relates to a kneading tool, in particular for vertical-axis or oblique-axis kneading machines.

BACKGROUND AND DESCRIPTION OF THE PRIOR ART

With particular reference to the field of industrial production, today there exist a well-defined series of kneading tools that are considered standard solutions and are each designed for working a given type of dough or for use, at least preferentially, with a given type of machine. For instance, helical tools, forked tools, and tools with diving arms are prevalently used for leavened-bread doughs, whereas whisk-like tools are used for whipped doughs such as sponge cake, mousse, etc.

The tools in question are solutions that decidedly date back in time, some of which were created at the start of the last century, and others even before.

Instead, kneading machines have themselves undergone a technological development consisting of minor but in any case continuous improvements, which have regarded, for example, the motors, the system of transmission of motion, the electronic control systems, etc., in some cases also exploiting the progress achieved in other fields.

OBJECT AND SUMMARY OF THE INVENTION

In this context, the present invention relates to a new kneading tool that makes it possible to obtain kneading results that cannot be achieved with the tools known today and that is able to provide a whole series of advantages, which will be discussed in greater detail in what follows. Moreover, as will become evident hereinafter, the tool described herein makes it possible to exploit fully the possibilities of new-generation kneading machines, in particular from the standpoint of the power that can be delivered and of the multiple operating modes that can be implemented thereby.

In general, the tool described herein is characterized by the features recalled in claim 1.

Further features and advantages of the invention will emerge clearly from the ensuing description with reference to the annexed drawings.

BRIEF DESCRIPTION OF THE DRAWINGS

The annexed drawings are provided purely by way of non-limiting example and in which.

DESCRIPTION

In the ensuing description various specific details are illustrated, aimed at enabling an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided only for convenience and hence do not define the sphere of protection or the scope of the embodiments.

The kneading tool described herein has been devised in particular for use in vertical-axis or oblique-axis kneading machines. In the figures, the reference axis X shows the axis of rotation of the tool mounted on the kneading machine.

The kneading tool, designated as a whole by the reference number 10, includes an end portion 2, for connection of the tool to the drive shaft of the kneading machine, from which a central shaft 4 extends along the main axis I of the tool, which comes to coincide with the axis of rotation X, in its installed condition. Branching from the shaft 4 in substantially radial directions are a series of transverse arms 6, which are preferably inclined with respect to the main axis I by a respective angle $\beta$ other than 0° and 90°.

The arms 6 may be positioned in different orientations about the shaft 4 and/or in different positions along the shaft. As a whole, in the tool described herein, the arms 6 are staggered and not overlying with respect to one another.

Figure 1:
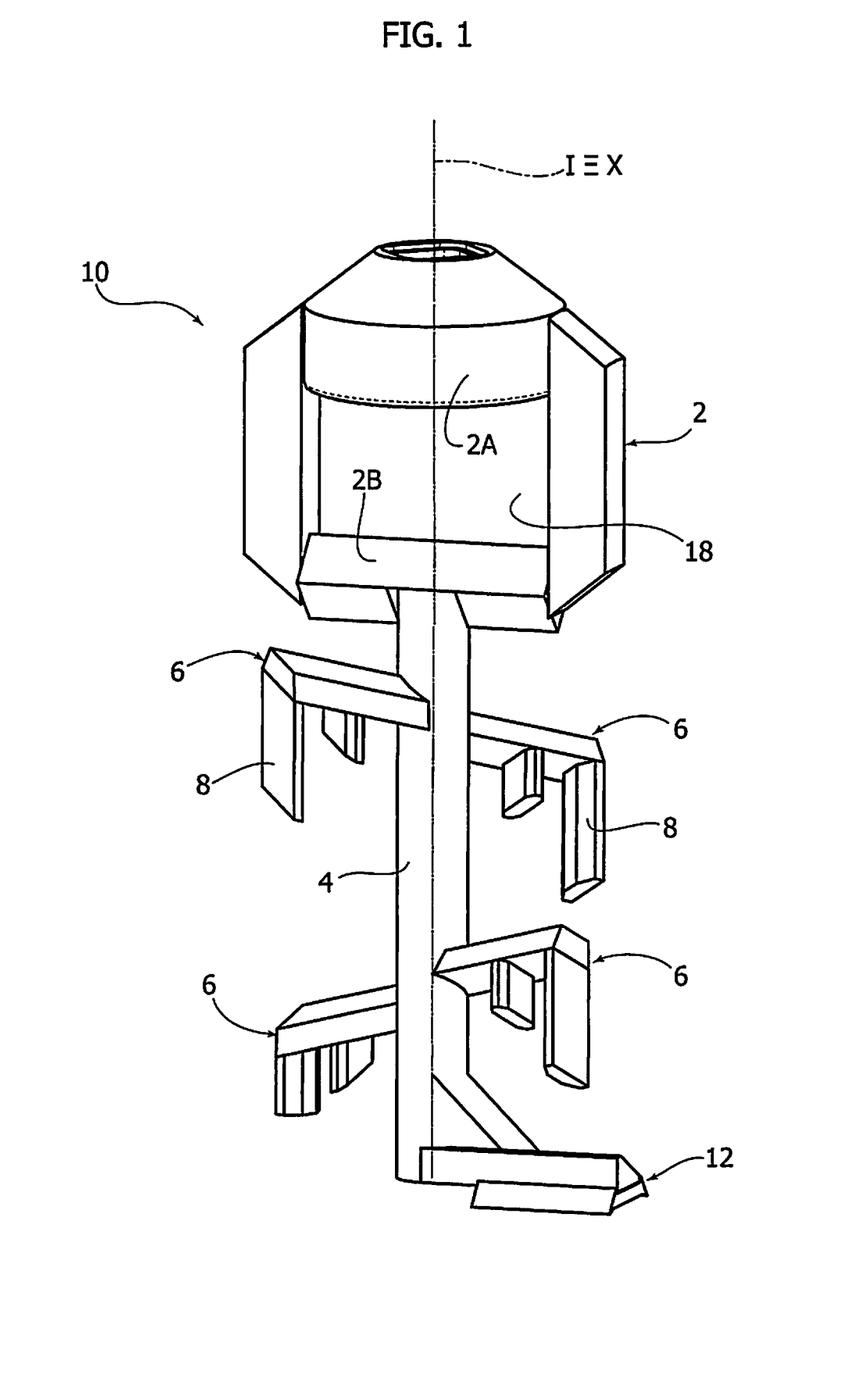
FIG. 1 represents a preferred embodiment of the tool described herein, according to an axonometric view.
Figure 2:
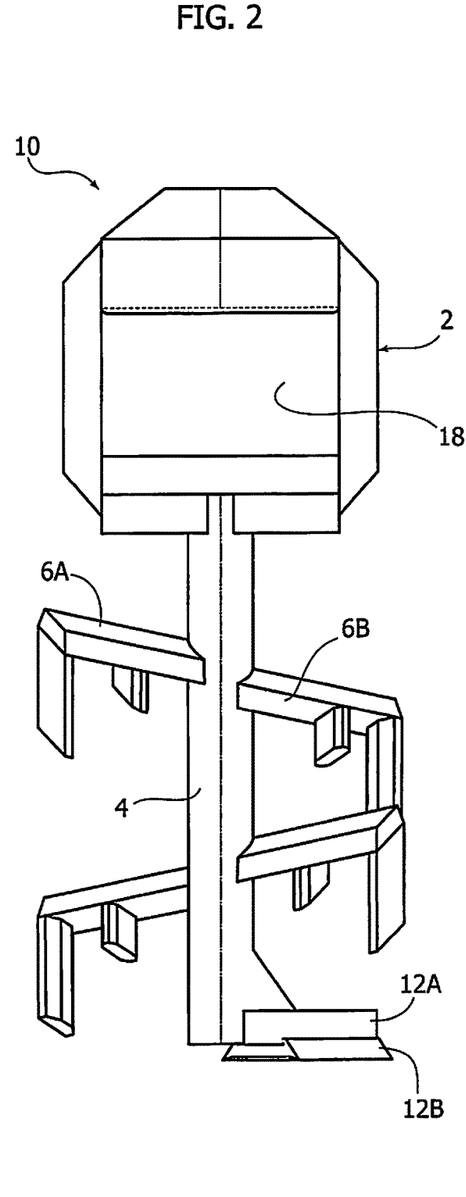
FIG. 2 is a front view of the tool of FIG. 1.
Figure 3:
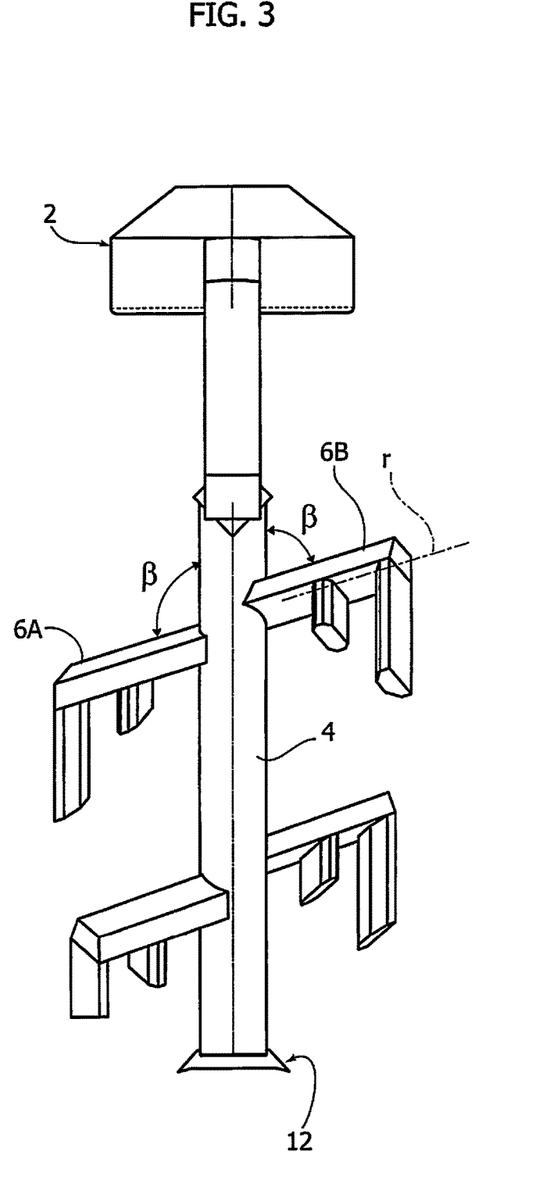
FIG. 3 is a view in projection according to the direction A indicated in FIG. 2.

In various preferred embodiments, as in the one illustrated, provided in one and the same position along the shaft 4 is a pair of arms 6, which extend in one and the same diametral direction and in opposite directions, defining, with respect to the shaft 4, respective angles supplementary to one another, so as to be located substantially along one and the same straight line r that intersects the main axis I (FIG. 3).

In various preferred embodiments, as in the one illustrated, such a pair of arms is provided in a number of longitudinal positions of the shaft 4 (in the example illustrated in two different positions). Moreover, in various preferred embodiments, as in the one illustrated, the arms of the various pairs define diametral directions—in plan view (FIGS. 5 and 6)—that are variously oriented about the shaft 4.

Figure 9:
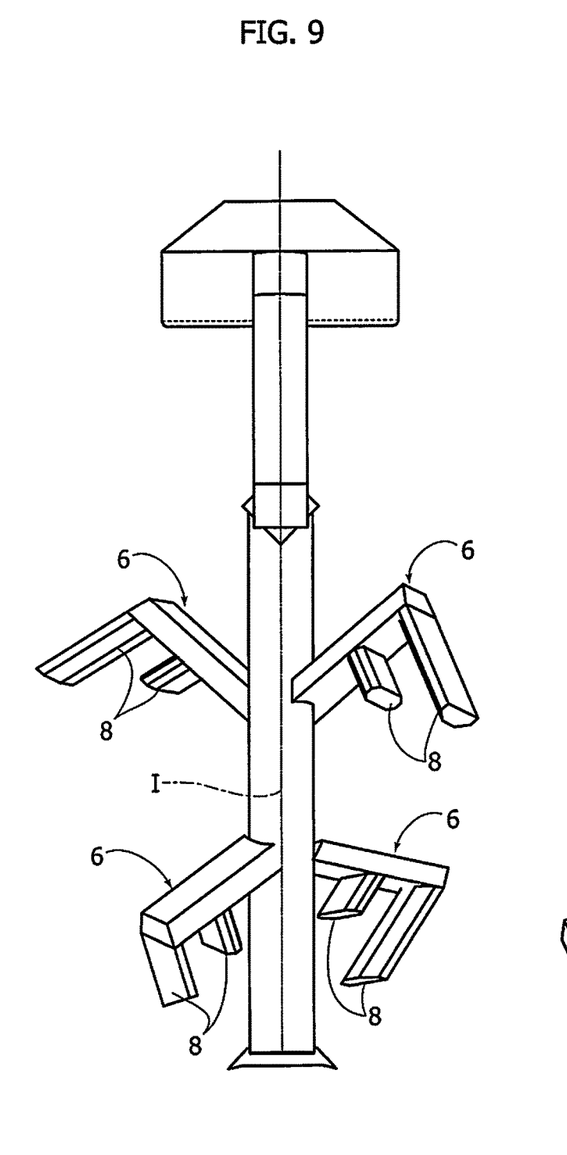

In various alternative embodiments, the arms of one and the same pair may, instead, be inclined with respect to the main axis I by angles such that the two arms define respective straight lines that are incident with respect to one another, substantially in one and the same point of intersection with the main axis I. In various embodiments, the two arms of the pair are inclined according to two angles smaller or greater than 90° (this applying to both arms), preferably by angles equal to one another, being oriented upwards or downwards with reference to their condition of installation (FIG. 9). Preferably, the arms in question are oriented downwards, with reference to their condition of installation.

Figure 8:
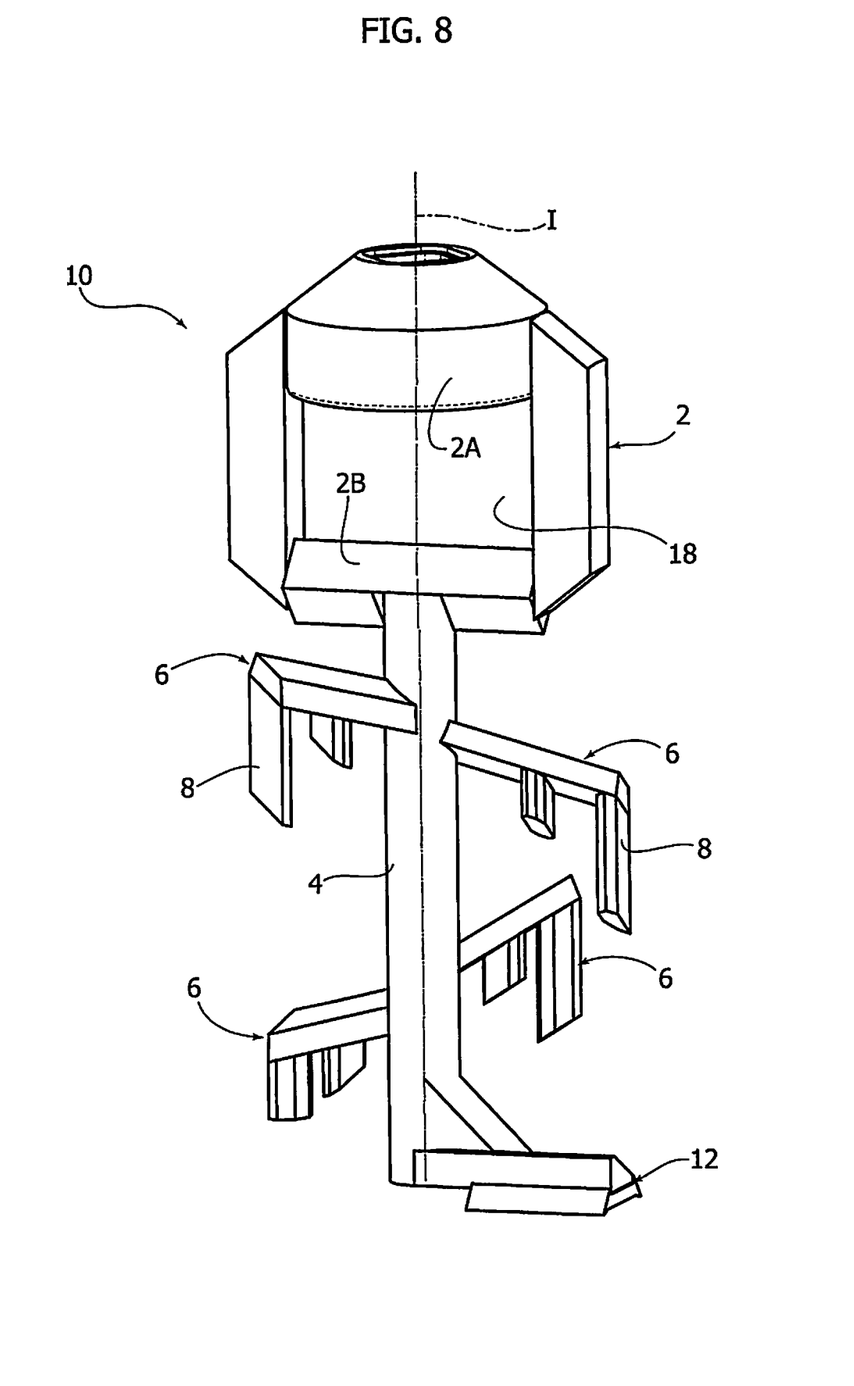
FIGS. 8, 9, and 10 illustrate three further variants of the tool described herein.

In further alternative embodiments (see FIG. 8), the arms 6 of one and the same pair of arms arranged in one and the same position along the main axis I are oriented in different radial directions about the main axis I, for example in respective directions that form between them an angle other than 0° and 180°, preferably an angle equal to 90°. The arms 6 in question may likewise present inclinations with respect to the main axis I that are different from one another or the same as one another.

Figure 4:
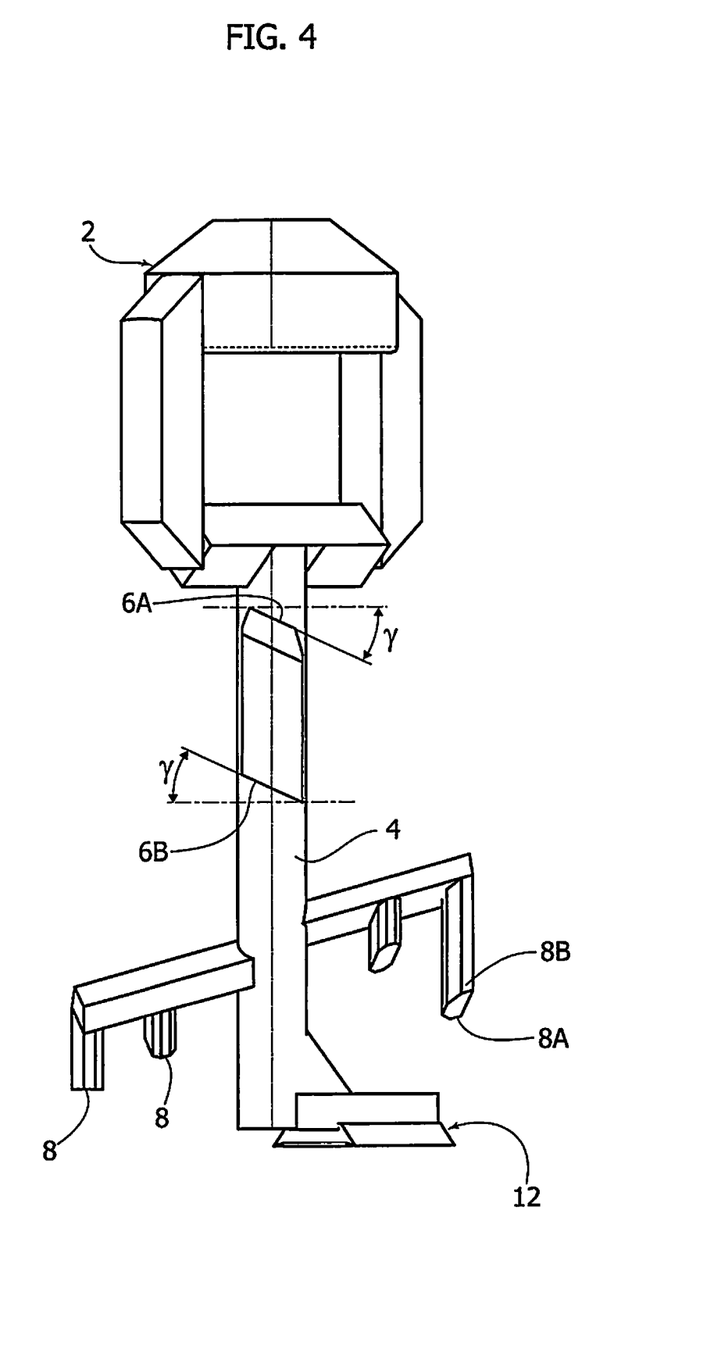
FIG. 4 is a side view of the tool of FIG. 1.

In various preferred embodiments, as in the one illustrated, the arms 6 each have two surfaces 6a, 6b opposite to one another, which are inclined with respect to a plane orthogonal to the main axis I of the tool, in particular by an angle □ other than 0° and 90° (FIG. 4); the surface 6a faces the end portion 2, whereas the surface 6b faces the opposite end of the tool. The inclination of these surfaces is substantially the same for the various arms; in particular, the direction of inclination is kept constant given the same direction of rotation about the axis I. This configuration means that the surfaces 6a and 6b of the arms exert all together an action of thrust on the dough, in the direction W1 oriented towards the end portion 2 for the surfaces 6a, and in the direction W2 oriented towards the opposite end for the surfaces 6b, according to the direction of rotation of the tool about the axis X. With reference to the embodiment illustrated in the figures, a rotation in a clockwise direction causes an action of thrust by the surfaces 6b, and a rotation in a conterclockwise direction causes an action of thrust by the surfaces 6a.

In any case, it should be noted that it is possible to envisage also embodiments in which only some of the arms 6 have the aforesaid opposite surfaces inclined.

Moreover, in various preferred embodiments, as in the one illustrated, the arms 6 have a series of blades 8, which project towards one or the other of the two ends of the tool and are distributed along the extension of the corresponding arm.

The blades 8 can be arranged in a direction parallel to the main axis I or else be inclined with respect thereto.

Figure 10:
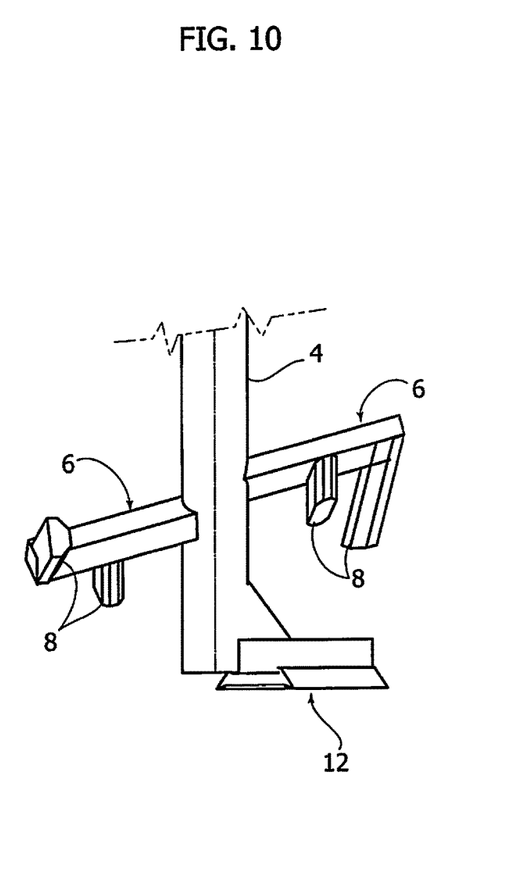

In embodiments like the one illustrated in FIG. 10, the blades 8 of a single arm 8 may be variously oriented about the longitudinal axis of the arm.

Preferably, the blades 8 of a single arm project all on one and the same side. In various preferred embodiments, as in the one illustrated, the blades 8 project towards the end of the tool opposite to the portion 2; i.e., they project downwards, in the case of a vertical-axis or oblique-axis tool.

In various preferred embodiments, as in the one illustrated, the blades 8 are substantially rectilinear and extend in a direction parallel to the shaft 4.

Figure 5:
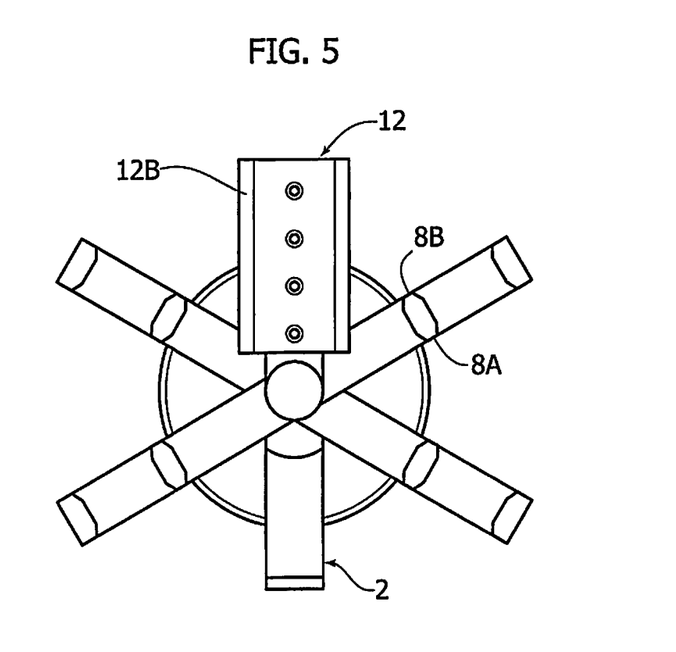
FIG. 5 is a plan view from below of the tool of FIG. 1.
Figure 6:
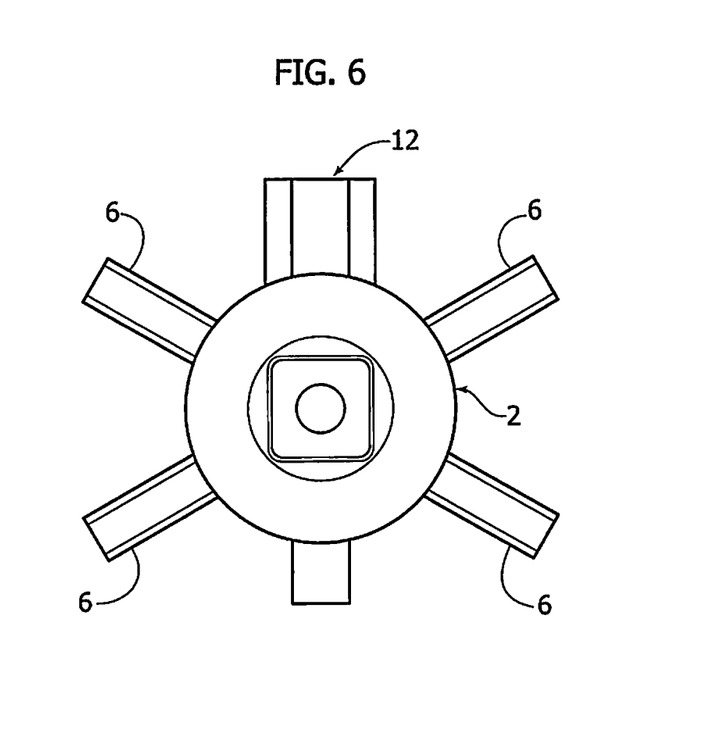
FIG. 6 is a top plan view of the tool of FIG. 1.

Moreover, once again preferably, the blades 8 have, in cross section, an elongated profile that is oriented along a corresponding circular path about the axis I so that they turn, in the two directions of rotation, opposite edges 8a, 8b, defined by the profile, that are able to penetrate easily into the dough (FIG. 5).

Once again, in various preferred embodiments, as in the one illustrated, the blades 8 of each arm have different lengths and are preferably arranged in order of increasing length from the inner end of the arm towards the outer end. In various preferred embodiments, as in the one illustrated, for each arm 6 a blade 8 is provided at its outer end, which hence constitutes the longest blade of the arm.

Alternative embodiments may envisage that the arms 6 carry thereon a single blade 8, preferably set at the outer end of the arm. Moreover, further embodiments may envisage a plurality of blades 8 for each arm, all of one and the same length; also in this case it is preferable for a blade 8 to be set at the outer end of the arm.

In various preferred embodiments, as in the one illustrated, the tool 10 is equipped with a scraper member 12, mounted on the end of the tool opposite to the portion 2, which has the function of removing and lifting the material that deposits on the bottom of the bowl of the kneading machine, via an action of scraping induced by the movement of rotation of the tool. In various preferred embodiments, as in the one illustrated, the member 12 is in particular constituted by a plate 12a, set in a plane orthogonal to the axis I and projecting radially with respect to the shaft 4, and by a layer 12b of anti-friction material anchored on the face of the plate 12a that faces the side opposite to the portion 2 of the tool.

In various preferred embodiments, as in the one illustrated, the end portion 2 consists of a bracket structure that defines a central attachment flange 2a, on one end side thereof, and a cross member 2b on the opposite side, in a position set at a distance therefrom, to which the shaft 4 is connected, in a central position. This bracket structure makes it possible to separate the flange 2a from the shaft 4, by providing between them the opening 18, which constitutes free and direct access to the flange 2a, designed to facilitate connection of the tool to the drive shaft of the kneading machine.

With specific reference now to the operation of the tool described herein, it should first of all be noted that it can operate alone as well as in combination with another tool, which in turn may be of the same type or else of a different type.

As mentioned above, the arms 6 have the function of pushing the dough selectively upwards or downwards according to the direction of rotation of the tool so as to bring about mixing of the dough in a vertical plane. The kneading machine may be set so as to alternate the two directions of rotation of the kneading tool, thus amplifying the action of mixing performed by the tool.

On the other hand, the blades 8 penetrate into the dough so as to divide it in a number of planes, this bringing about a mixing of the dough that occurs prevalently in a horizontal plane.

As a whole, the action exerted by the arms 6 and by the blades 8 hence causes movement of the dough in a number of directions, subjecting it to an extremely intense mixing operation.

In preferred embodiments, the operation of the tool described herein provides a mode of operation thereof such that the dough is pushed from top down, and laterally, from right to left, or vice versa.

In general, the solution described herein regards also a method for carrying out a kneading operation in a kneading machine provided with a tool as described herein, which is mounted on said machine with its own main axis I aligned to an axis of rotation X of said machine,
  the method including the steps of:
  inserting said tool inside a bowl containing a plurality of ingredients to be kneaded;
  turning said tool about said axis of rotation X; and
  via said arms 4 of said tool pushing the dough being prepared, which is formed by said plurality of ingredients, in a direction transverse to the bottom of the bowl, from top down or else from bottom up.
  Preferably, the method includes:
  via said blades 8, pushing said dough being prepared in directions transverse to a vertical direction.

The present applicant has found that the tool described herein makes it possible to obtain results that are considerably superior to those of conventional tools, and this above all when it is used for kneading high-fat doughs or loosely bound doughs, for example doughs for short pastry, cookies, and biscuits in general.

Moreover, as seen above, the scraper member 12 prevents, during the kneading operation, accumulation on the bottom of the bowl of ingredients that remain unmixed, or else sticking thereon of a layer of dough.

Figure 7:
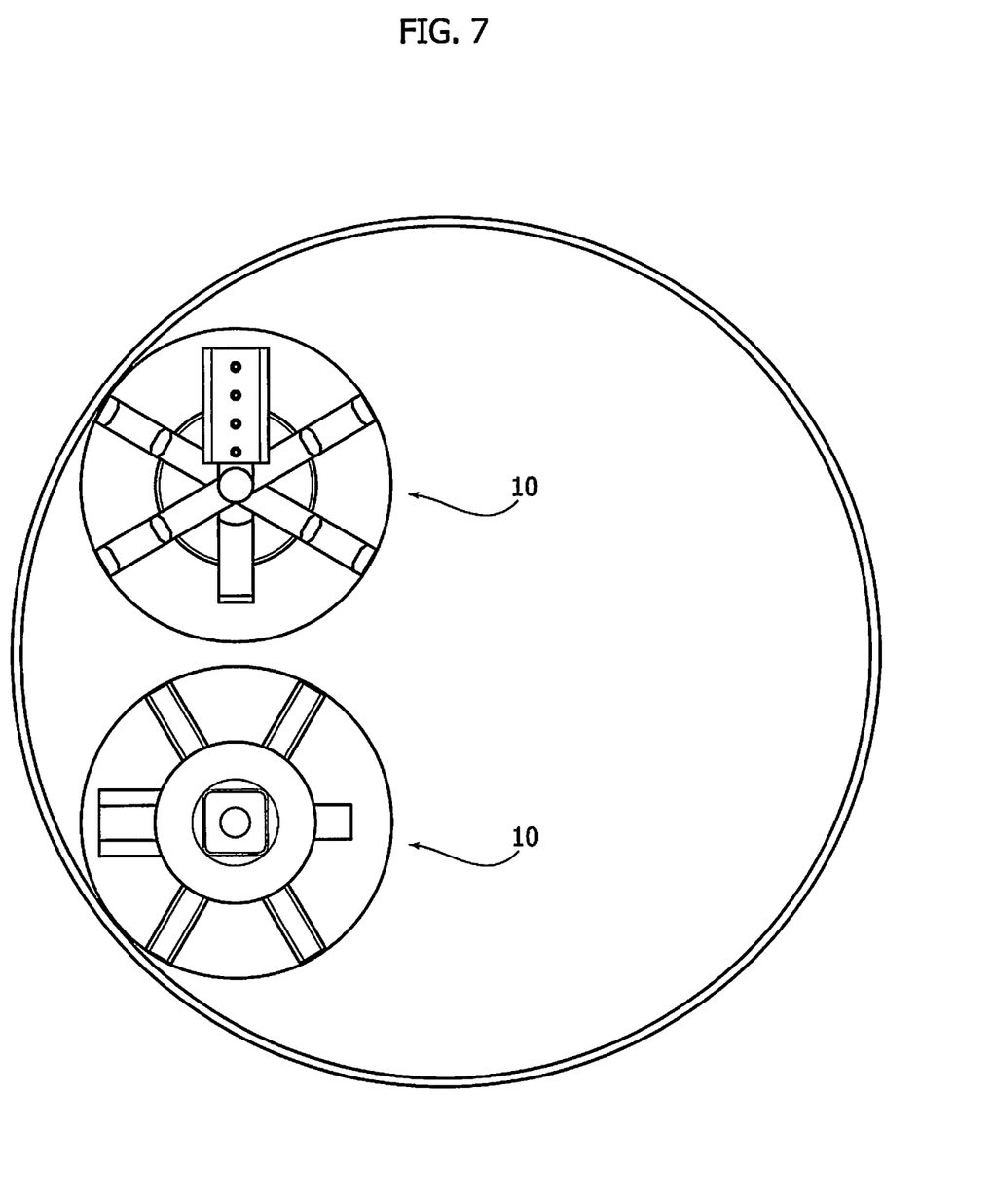
FIG. 7 is a schematic illustration of an example of application of the tool of FIG. 1 in a kneading machine.

Preferred applications of the tool envisage its use both on kneading machines with rotating bowl and on kneading machines of a planetary type with fixed bowl (see FIG. 7).

On the other hand, in addition to the advantages linked to the kneading operation proper, it may moreover be noted that the inclination of the arms 6 favours detachment of the dough from the tool when the latter is taken out of the bowl.

The same general configuration of the tool is unlikely to withhold the dough, even though this tool is provided with a relatively large overall operating surface for exerting a high-intensity mixing action. This is obtained thanks to the limited and reduced horizontal surfaces and to the fact that the arms are staggered with respect to one another, in addition to being inclined downwards, as already mentioned. As has been said, in the tool described herein, the arms 6 are as a whole staggered and non-overlying with respect to one another (in top plan view).

In this connection, the present applicant has found that in actual fact the amount of dough that remains withheld by the tool is decidedly less as compared to conventional tools with comparable surfaces.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

What is claimed is:

1. A kneading tool prearranged for being mounted in a rotatable way about an axis of rotation of a kneading machine, said tool including:
    a central shaft defining a main axis;
    an end portion at an upper end of the central shaft adapted for connecting the kneading tool to the kneading machine;
    a scraper member at a lower end of the central shaft opposite the upper end; and
    a plurality of pairs of arms transverse to said central shaft, which are positioned in different orientations about the central shaft and in different positions along the main axis so as to be staggered and not overlying with respect to one another, wherein the plurality of pairs of arms consists of all arms extending from the central shaft of the tool between and not including the end portion and the scraper member,
    wherein each arm of each of the plurality of pairs of arms defines a first surface and a second surface opposite to one another, each inclined with respect to a plane orthogonal to the main axis by an inclination angle y other than 0° and 90°, the inclination angle y relative to the plane orthogonal to the main axis being the same for all of the first and second surfaces, wherein the first surfaces face an upper end of the tool and the second surfaces face an opposite bottom end of the tool, and
    wherein given a same direction of rotation of the central shaft about said main axis, a direction of inclination is kept constant between said first surfaces and is kept constant between said second surfaces, respectively, in such a way that rotation of said tool in a first direction of rotation exerts an action of thrust on dough by one of said first and second surfaces in a first direction toward the upper end and not in a second opposite direction toward the bottom end, and rotation of said tool in a second opposite direction of rotation exerts an action of thrust on the dough by the other of said first and second surfaces in the second opposite direction and not in the first direction, wherein the direction of inclination is different between the first surfaces and the second surfaces.

2. The tool according to claim 1, wherein said plurality of arms are inclined with respect to the main axis by an angle β other than 0° and 90°.

3. The tool according to claim 1, wherein each arm of the plurality of arms has at least one blade projecting in a direction of one end of said central shaft.

4. The tool according to claim 3, wherein each arm of the plurality of arms has a series of projecting blades, distributed along its extension.

5. The tool according to claim 4, wherein said blades are of different length.

6. The tool according to claim 3, wherein said at least one blade is positioned on an outer end of each arm.

7. The tool according to claim 4, wherein said blades extend in a direction parallel to the main axis or else in respective directions inclined with respect to the main axis.

8. The tool according to claim 4, wherein said blades each have a cross section with an elongated profile that is oriented along a circular path about said main axis so that each individual blade will turn, in two directions of rotation about said main axis, with opposite edges designed to penetrate into the dough.

9. The tool according to claim 1, wherein the end portion consists of a bracket structure, which has, on a side thereof, a central flange, for connection of said tool to the kneading machine, and a cross-member portion on an opposite side, in a position at a distance from the central flange along the main axis, to which said central shaft is connected,
    wherein said bracket structure defines, between said flange and said cross-member portion, an opening for direct access to said flange from outside.

10. The tool according to claim 4, wherein said blades project from said plurality of arms towards one end of said tool opposite to a portion for mounting said tool on the kneading machine.

11. A method for carrying out a kneading operation in the kneading machine provided with the kneading tool according to claim 1, which is mounted on said kneading machine with its own main axis aligned to the axis of rotation of said kneading machine, said method including the steps of:
    inserting said tool inside a bowl containing a plurality of ingredients to be kneaded;
    turning said tool about said axis of rotation; and
    via said plurality of arms of said tool, pushing the dough being prepared that is formed by said plurality of ingredients, in a direction transverse to a bottom of the bowl, from top down or else from bottom up.

12. The method according to claim 11, further comprising:
    via said blades, pushing said dough being prepared in directions transverse to a vertical direction.

13. The method according to claim 11, wherein the staggered and non-overlying positioning of said plurality of arms provides for minimization of action, exerted by said plurality of arms, in layering of the dough.

* * * * *